Feb. 10, 1970 A. L. KOHL 3,494,468
REVERSE OSMOSIS SYSTEM
Filed Jan. 2, 1968 2 Sheets-Sheet 1

INVENTOR.
ARTHUR L. KOHL
BY Donald J. Ellingsberg

Feb. 10, 1970  A. L. KOHL  3,494,468
REVERSE OSMOSIS SYSTEM

Filed Jan. 2, 1968  2 Sheets-Sheet 2

INVENTOR.
ARTHUR L. KOHL
BY

United States Patent Office 3,494,468
Patented Feb. 10, 1970

1

3,494,468
REVERSE OSMOSIS SYSTEM
Arthur L. Kohl, Woodland Hills, Calif., assignor to
North American Rockwell Corporation
Filed Jan. 2, 1968, Ser. No. 695,135
Int. Cl. B01d 13/00
U.S. Cl. 210—321                               6 Claims

ABSTRACT OF THE DISCLOSURE

A reverse osmosis system that produces pure water from saline water by using a plurality of collector trays assembled in a stacked unit and positioned within a pressure vessel.

Background of the invention

The need for water in the world is basic. And to satisfy this need, appropriate emphasis is being placed on developing processes that will economically produce pure water from sea water, or from other saline or brackish waters.

One process that produces pure water is the reverse osmosis process. When saline water and pure water are separated by a semipermeable membrane, osmosis creates a flow of pure water through the membrane into the saline water. If the saline water is subjected to a pressure greater than the natural osmostic force, the process is reversed and pure water in the saline water is forced through the membrane to the pure water side, leaving concentrated salts behind.

Desalination systems using the reverse osmosis process can be economical for saline water conversion because of simplicity and the near approach to an ideal thermodynamic system. Yet, an analysis of a reverse osmosis system indicates that the membranes, membrane backup structures, and pressure vessel represent major costs. Therefore, increased emphasis must be placed on the total system design for maximum economy.

Objects of the invention

Accordingly, it is an object of the invention to provide a new and improved reverse osmosis system.

Another object of the invention is to provide a new and improved reverse osmosis system having a maximum area of useful membrane surface per unit volume of high pressure containment.

A further object of the invention is to provide a new and improved collector tray for a reverse osmosis system.

Likewise an object of the invention is to provide a new and improved collector tray having an inexpensive backing material for the reverse osmosis membranes.

An additional object of the invention is to provide a collector tray for a reverse osmosis system that substantially reduces the total distance that a product fluid must travel through the backing material.

It is also an object of the invention to provide low-cost sealing methods for the reverse osmosis membranes of the collector tray.

Still a further object of the invention is to provide a new and improved tray spacer member for a reverse osmosis system that cooperates with adjacent collector trays and channels a feed fluid flow between the collector trays.

An additional object of the invention is to provide a reverse osmosis system in which the feedwater passage dimensions and thereby the Reynolds number can be varied.

Summary of the invention

Briefly, in accordance with the invention, the new and improved reverse osmosis system has a plurality of collector trays that are assembled in a stacked unit and positioned within a pressure vessel. Each of the collector trays is formed with a pair of semipermeable membranes spaced apart by a suitable backing material that is in fluid communication with at least one channel member. As a pressurized feed fluid flows through the stacked unit, the backing material collects a product fluid that passes through the membranes and directs the product fluid to the channel member. The product fluid passes through the channel member to suitable product fluid outlets where it passes from the pressure vessel. Spacer members between adjacent collector trays not only support the planar central regions of adjacent trays but also define a tortuous feed fluid path between the trays so that the feed fluid flows at a predetermined velocity through the stacked trays.

These and other objects of the present invention will be more apparent from the following detailed description and claims, together with the accompanying drawings, made a part hereof.

Description of the invention

Figure 1:
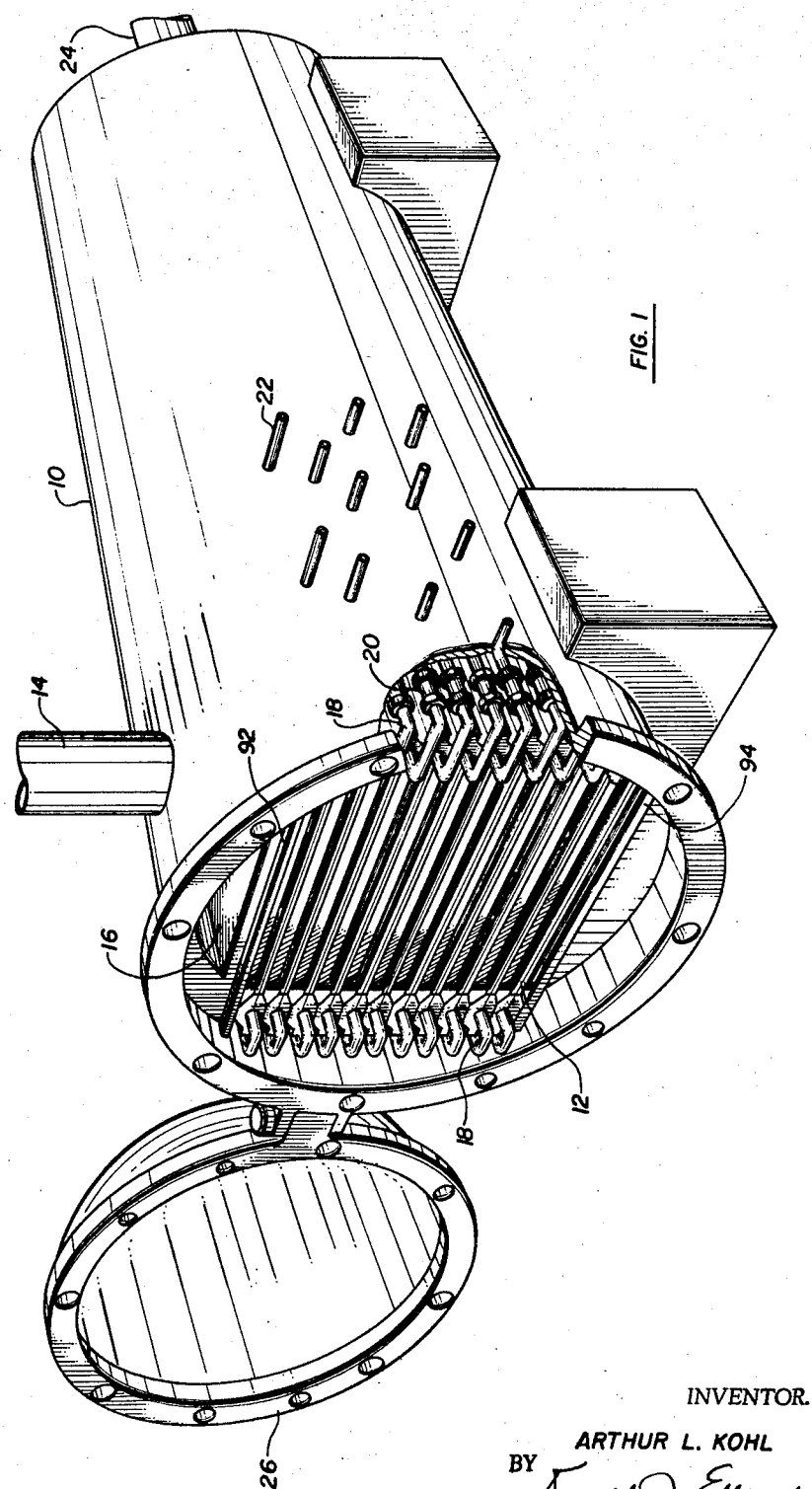
FIGURE 1 is a perspective view of one form of reverse osmosis system formed in accordance with the invention.

In FIGURE 1, a vessel means such as pressure vessel 10 receives a plurality of similar collector tray means, such as collector tray 12, that can be arranged in a stacked unit. A pressurized feed fluid such as sea water or other saline water or brackish water is introduced from a feed fluid source (not shown) through a feed fluid inlet 14 into the pressure vessel 10. The feed fluid passes through an internal channel 16 within the pressure vessel 10 and into the stacked unit of similar collector trays. A product fluid, such as pure water, is removed by the collector trays from the feed fluid by the reverse osmosis process and passes from each collector tray 12 through a tray header conduit 18 that is connected by a conventional union 20 to a product fluid outlet 22. Since the feed fluid contains salts that remain dissolved in a more concentrated solution after the removal of the pure water, the remaining pressurized feed fluid or brine passes from the pressure vessel 10 through a brine outlet 24 to a brine collection system (not shown). A hinged lid 26 completes the pressure vessel 10.

Figure 2:
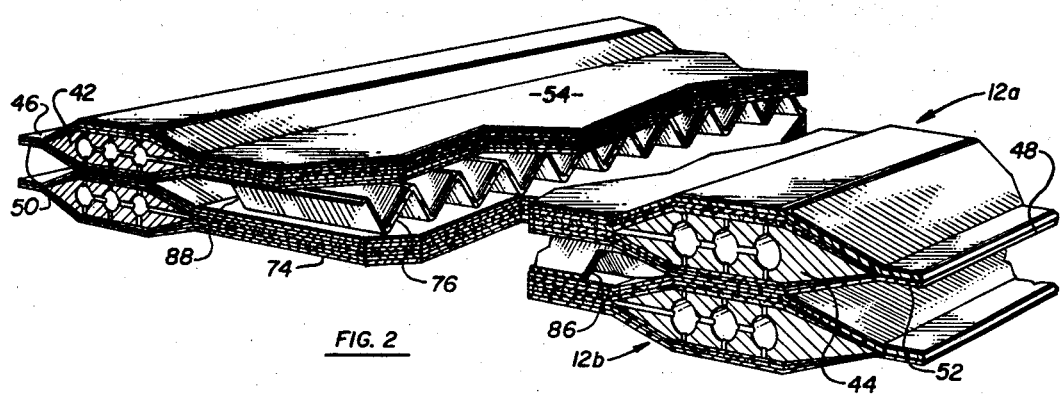
FIGURE 2 is a perspective and schematic view, partly broken away, of a portion of the reverse osmosis system of FIGURE 1.
Figure 3:
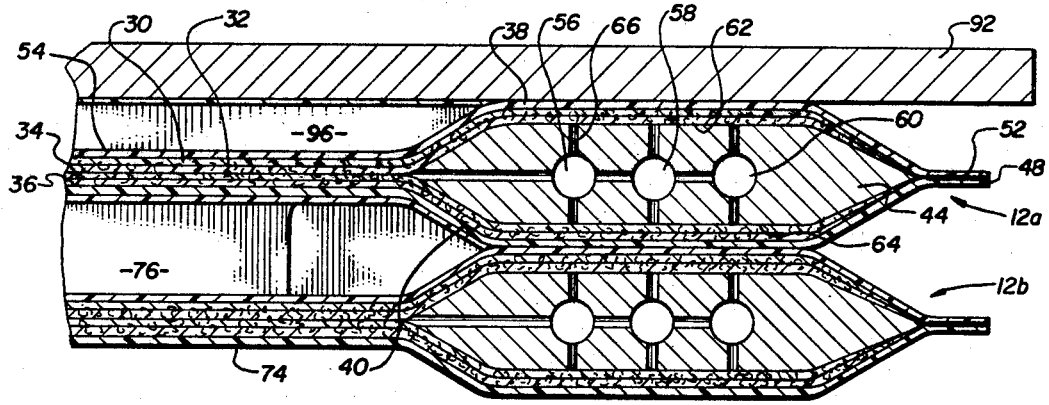
FIGURE 3 is an enlarged, sectional view of the portion of the reverse osmosis system of FIGURE 2.

Referring to FIGURES 2 and 3, similar collector trays 12a and 12b are shown. Collector tray 12a has one or more layers of a collector backing means, such as backing layers 30, 32, 34 and 36, sandwiched between reverse osmosis membranes 38 and 40. The reverse osmosis membranes 38 and 40 can be formed from a cellulose acetate-acetone-formamide solution such as taught by U.S. Patent No. 3,133,132, although it is contemplated that other suitable membranes can be used. The backing layers 30, 32, 34 and 36, and the membranes 38 and 40 are arranged to enclose a channel member means such as side channel members 42 and 44. Channel members 42 and 44 are generally positioned adjacent the opposite collector tray edges 46 and 48, respectively, and extend along the length of collector tray 12a. Membranes 38 and 40 are bonded together, preferably by a chemical bonding sealant such as epoxy cement or the like, adjacent the opposite edges 46 and 48 at bond regions 50 and 52, respectively. The backing layers 30, 32, 34 and 36 in the collector tray 12a as illustrated by FIGURES 2 and 3 terminate before reaching the bond regions 52 so that the membranes 38 and 40 can come together. The spaced-apart channel members 42 and 44 generally define a planar central region 54 of collector tray 12a that forms an active reverse osmosis membrane area.

The similar channel members 42 and 44, as particularly shown by FIGURE 3, have a longitudinally extending fluid passage means such as the generally parallel but spaced-apart major longitudinal apertures 56, 58 and 60 suitably formed in the core of channel member 44. The longitudinal apertures 56, 58 and 60 extend along the length of channel member 44 and are in fluid communication with planar outer portions 62 and 64 of the channel member through a plurality of similar minor apertures 66. The minor apertures 66 are suitably spaced along the longitudinal length of channel member 44 and are in fluid communication with the backing layers 30, 32, 34 and 36. It is contemplated that a channel member can have only one major longitudinal aperture; for example, where a flattened tube is used as the channel member. It is also contemplated that the minor aperture or apertures can be continuous slots in the channel member.

When the collector trays 12a and 12b are arranged as shown by FIGURES 2 and 3, the planar central region 54 of collector tray 12a is maintained in spaced-apart relationship with a similar planar central region 74 of collector tray 12b by a spacer means, such as corrugated tray spacer 76. The tray spacers, such as spacer 76, support the flexible planar central regions of the adjacent collector trays in the stacked unit, and define a tortuous feed fluid path between the adjacent central regions for the pressurized feed fluid.

Figures 4, 5:
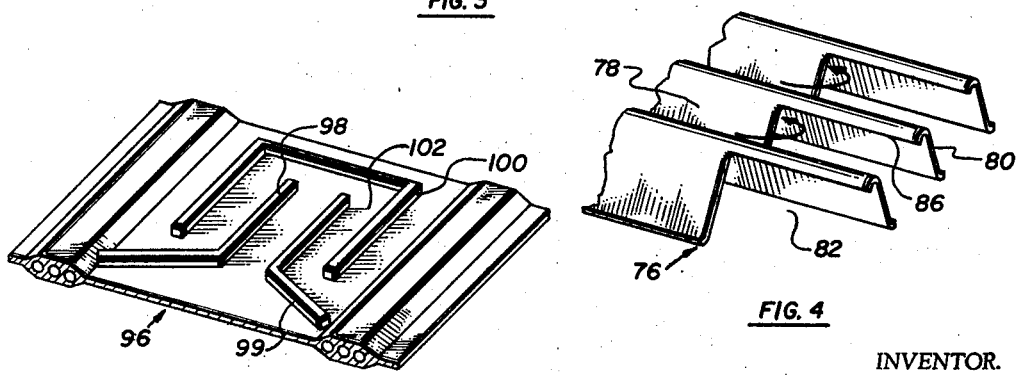
FIGURE 4 is a perspective view, partly broken away, of one form of spacer means used in the reverse osmosis system, particularly as shown by FIGURES 2 and 3.
FIGURE 5 is a perspective view of another form of spacer means for the reverse osmosis system of the invention.

Referring now to FIGURE 4, corrugated tray spacer 76 defines a plurality of adjacent and generally triangular channels, such as channels 78 and 80, that define a continuous but tortuous feed fluid path from a front tray-spacer inlet 82 to a similar back tray-spacer outlet (not shown). Suitable cutouts, such as cutouts 86 and 88 (see also FIGURE 2) are provided at alternate ends of the adjacent triangular channels so that the pressurized feed fluid can flow from channel-to-channel along the tortuous feed fluid path. The corrugated tray spacer 76 functions not only as a spacer member but also as a channel member that channels the pressurized feed fluid between the adjacent collector trays at a predetermined flow velocity so that, as the solids concentration of the feed fluid increases, excessive solids concentration buildup at the membrane/feed fluid boundary layer is minimized. Possible channel plugging is also minimized.

Referring particularly to FIGURE 3, the outer collector trays in the stacked unit, such as collector tray 12a, abut a force generating means such as pressure plate 92 and a similar pressure plate 94 (see FIGURE 1). The pressure plates 92 and 94 cooperate and place a compressive load upon the assembled collector trays in the stacked unit. The compressive load can be generated by any conventional means such as spring loading, clamp arrangements, vessel design, or the like. In FIGURE 3, a tray spacer 96 similar to that previously described is positioned between pressure plate 92 and colector tray 12a. A similar tray spacer (not shown) is positioned between pressure plate 94 and the adjacent collector tray.

Although a corrugated tray spacer 76 as shown by FIGURE 4 is generally preferred, another form of tray spacer means is shown by FIGURE 5. Tray spacer 96 is formed from one or more rib members, such as rib members 98, 99 and 100, that cooperate to define a tortuous feed fluid path 102 between adjacent collector trays that are similar to those described hereinbefore. It is also contemplated that a suitable tray spacer means can be a plurality of tablets suitably arranged between adjacent collector trays to maintain the active central regions thereof in the desired spaced-apart relationship. It is further contemplated that a relatively coarse, mesh spacer can also be used between adjacent collector trays in accordance with my invention.

Operatively, a pressurized feed fluid enters the pressure vessel 10 through the feed fluid inlet 14 and passes through the flow channel 16 to the stacked unit of collector trays 12. The feed fluid then passes through the tortuous feed fluid paths between the adjacent collector trays defined by the tray spacers 76. A product fluid, e.g., pure water, is forced from the feed fluid through the reverse osmosis membranes 38 and 40 into the backing layers 30, 32, 34 and 36. The pure water passes in a lateral direction along the backing layers to the side channel members 42 and 44, and then through the minor apertures 66 to the major apertures 56, 58 and 60. The side members collect the pure water and channel it to the tray header tubes 18. The water then passes from the pressure vessel 10 through the product fluid outlets 22. It is contemplated that conventional valves can be provided for the product fluid outlets 22 so that individual collector trays can be isolated; for example, if a particular collector tray is no longer functioning.

In the reverse osmosis system of my invention the minimum lateral distance that a product fluid must travel to the side channel members is relatively short which substantially minimizes excessive lateral pressure losses. Increased product fluid output can be obtained without an increase in lateral pressure losses by lengthening the collector trays without changing the tray width. When a specific feed-fluid Reynolds number is required, the feed fluid velocity through the tortuous feed fluid path can be increased or decreased at a given feed fluid pressure by either increasing or decreasing the size of the tray spacer channels.

Example

The reverse osmosis system as described has been tested with brackish water—approximately 2500 parts per million (p.p.m.) salt content—in a test vessel loop. The collector trays were two backing layers of 15-mil nylon parchment cemented to a flattened and apertured copper tube channel member. The backing layers and copper tube were sandwiched between two 8-mil cellulose acetate membranes that were bonded together at the outer edges with a suitable epoxy cement. The overall collector tray dimensions were about 5 inches wide by 5 inches long.

The collector trays were stacked on a suitable rack, placed within a pressure vessel, and subjected to successive feed water pressures of 600, 800 and 1000 pounds per square inch gauge (p.s.i.g.). Product water flow rates from the test system varied from about 9 gallons per square foot of active membrane surface per day to about 12 gallons per square foot per day, with salt content in the product water of less than 500 p.p.m. (pure water is defined as water containing less than 1,000 dissolved parts of salt per million parts of water). In another test, three collector trays similar to those described were operated with feed water pressures of 600 p.s.i.g. for about four hours. The feed water pressure was then increased to 800 p.s.i.g. for about 5 hours, and returned to 600 p.s.i.g. for about 5.3 hours; a total operating time of about 17.8 hours. The product water flow rate and product water salt content at 600 p.s.i.g., both before and after operation at the higher pressures, remained essentially the same.

Projecting the foregoing example to a 10,000 gallon per day reverse osmosis system leads to the following design summary:

Feed water: (Brackish water with 2500 p.p.m. salt concentration)., Inlet flow rate=12,500 gallons per day (gal./day).

Product water: (Pure water with less than 500 p.p.m. salt concentration)., Outlet flow rate=10,000 gal./day.
Membrane flux=20 gal./day/square foot.
Total membrane area=~500 square feet.
Tray dimensions (active membrane area)=12 inches wide by 64 inches long.
Number of trays=48.
Distance between trays=0.2 inch.
Brackish water velocity (ave.)=~0.7 feet per second.
Pressure drop across tray section=~30 p.s.i.g.
Separator vessel dimensions=22 inch outside diameter by~8 feet long.
Design pressure=900 p.s.i.g.
Operating pressure (minimum)=600 p.s.i.g.

As will be evidenced from the foregoing description certain aspects of the invention are not limited to the particular details of construction as illustrated, and it is contemplated that other modifications and applications will occur to those skilled in the art.

I claim:
1. A reverse osmosis system for collecting a product fluid from a pressurized feed fluid, the system comprising:
  (a) vessel means having a feed fluid inlet and a feed fluid outlet, and further having a product fluid outlet,
  (b) at least first and second collector tray means positioned within said vessel means in a generally stacked arrangement, said first tray means positioned adjacent to and cooperating with said second tray means, wherein each of said collector tray means comprises:
    (1) membrane means having a first surface and adapted to pass the product fluid in a predetermined direction through said membrane means, and
    (2) collector backing means enclosed by said membrane means collecting the product fluid passing through said membrane means.
  (c) generally planar central regions suitably formed in each of said collector tray means, each central region defining an active membrane area for said passing of the product fluid,
  (d) spacer means positioned between adjacent ones of said collector tray means, said spacer means maintaining said planar central regions of said adjacent tray means in a spaced-apart relationship and defining a feed fluid path between said tray means in fluid communication with said first surface, said feed fluid path having a feed fluid inlet and a feed fluid outlet in fluid communication with respective ones of said vessel feed fluid inlet and outlet, and
  (e) at least first and second spaced-apart channel members in fluid communication with said collector backing means and in fluid communication with said vessel product fluid outlet, said spaced-apart channel members cooperating with said membrane means and forming said planar central regions so that product fluid collected by said tray means during system operation passes from said vessel means.
2. The reverse osmosis system of claim 1 in which said feed fluid path is tortuous between said feed fluid inlet and outlet.

3. The reverse osmosis system of claim 1 in which each of said channel members has
  (a) at least a first longitudinally extending major aperture, and
  (b) at least a first laterally extending minor aperture in fluid communication with said collector backing means and said major aperture.

4. A collector tray for a reverse osmosis system that collects a product fluid from a pressurized feed fluid, the collector tray comprising:
  (a) membrane means having a first surface in fluid communication with the feed fluid, said membrane means adapted to pass the product fluid in a predetermined direction through said membrane means,
  (b) collector backing means enclosed by said membrane means and collecting the product fluid passing through said membrane means, and
  (c) channel member means in fluid communication with said collector backing means having at least first and second spaced-apart channel members in fluid communication with said collector backing means and selectively enclosed by said membrane means, said first and second spaced-apart channel members cooperating with said membrane means and forming a generally planar central region that develops an active membrane area in said first surface for passing the product fluid so that the product fluid passes along said collector backing means and collects in said channel member means which further channels the product fluid in a predetermined direction whereby the product fluid passes from the collector tray.

5. The collector tray of claim 4 in which said membrane means are at least first and second spaced-apart membranes enclosing said collector backing means.

6. The collector tray of claim 4 in which said channel member means has
  (a) at least a first longitudinally extending major aperture, and
  (b) at least a first laterally extending minor aperture in fluid communication wtih said collector backing means and said major aperture.

References Cited

UNITED STATES PATENTS

| | | | |
|---|---|---|---|
| 3,344,926 | 10/1967 | Barnabe et al. | 210—321 |
| 3,397,785 | 8/1968 | Jarvis et al. | 210—321 X |
| 3,398,833 | 8/1968 | Marks et al. | 210—321 |
| 3,398,834 | 8/1968 | Nuttall et al. | 210—321 |

OTHER REFERENCES

R. and P. Progress Report No. 86 (by Aerojet-General Corp.), "Design and Construction of a Desalination Pilot Plant (A Reverse Osmosis Process)," for U.S. Office of Saline Water, Dept. of Interior, Apr. 10, 1964, p. 15 and FIGS. 18 and 19 relied on.

REUBEN FRIEDMAN, Primary Examiner

FRANK A. SPEAR, JR., Assistant Examiner

U.S. Cl. X.R.

210—346, 433, 486